United States Patent [19]

Fost

[11] Patent Number: 4,809,017

[45] Date of Patent: Feb. 28, 1989

[54] INK JET PRINTING HEAD

[75] Inventor: Ian M. Fost, Cambridgeshire, England

[73] Assignee: Domino Printing Sciences PLC, Cambridge, England

[21] Appl. No.: 141,530

[22] Filed: Jan. 7, 1988

[30] Foreign Application Priority Data

Jan. 7, 1987 [GB] United Kingdom ................. 8700203

[51] Int. Cl.4 ............................................. G01D 15/16

[52] U.S. Cl. ...................................... 346/75; 118/313; 346/140 R

[58] Field of Search .................. 346/75, 140; 118/313, 118/315

[56] References Cited

U.S. PATENT DOCUMENTS 4,450,375 5/1984 Siegal ................................. 310/331

4,521,788 6/1985 Kimura .............................. 346/140

4,576,111 3/1986 Slomianny .......................... 118/313

4,723,131 2/1988 Droit .................................... 346/75

*Primary Examiner*—Joseph W. Hartary

*Attorney, Agent, or Firm*—Robbins & Laramie

[57] ABSTRACT

An ink jet printing head has a chamber for pressurized ink and a substantially linear array of outlet nozzles (5) leading from the chamber. A plurality of closure elements are selectively displaceable by respective actuators (13) to open and close respective ones of the nozzles. The closure elements are provided on respective flexible strips (7), each of which is fixed at one end and has the closure element at the other end and is displaceable by a respective actuator acting on the strip between its ends. At least some of the strips interdigitate with one another at their closure element-carrying ends from opposite sides of the substantially linear array of nozzles.

10 Claims, 3 Drawing Sheets

INK JET PRINTING HEAD

DESCRIPTION

The invention relates to an ink jet printing head of a kind, hereinafter referred to as of the kind described, having a chamber for pressurized ink or other fluent marking material, a substantially linear array of outlet nozzles leading from the chamber, and a plurality of closure elements which are selectively displaceable by respective actuators to open and close respective ones of the nozzles.

In typical use, the head is used with the linear array of nozzles in a vertical orientation and articles, such as cartons, are moved horizontally past the head and are appropriately marked as the nozzles are opened and closed to allow controlled jets of the marking material to impinge on the sides of the articles.

Our GB-A No. 2134452 discloses a printing head of the kind described and as disclosed in that specification, the closure elements are closure heads which are fixed on the ends of flexible wires which pass out of the chamber and are connected to the armatures of respective solenoids. Coil springs surrounding the wires within the chamber urge the heads into sealing engagement with the inner ends of the nozzle orifices and, when appropriate solenoids are actuated, the wires are pulled so that the corresponding heads are drawn axially away from the nozzle against spring action to allow ink to be discharged through the corresponding nozzles. Although this arrangement is generally satisfactory, in that the flexible wires allow the solenoids to be spread and clustered other than directly in axial alignment with the corresponding nozzles, the need for the closure heads to work freely side by side in direct axial alignment with the nozzles imposes a practical limitation on the closeness of the centres of adjacent nozzles and hence on the definition of the ultimate marking. For example, with a system such as disclosed in No. 2134452, it is difficult to reduce the length of an array of seven nozzles to less than 12 mm.

In accordance with the present invention, in an ink jet printing head of the kind described, the closure elements are provided on respective flexible strips, each of which is fixed at one end and has the closure element at the other end and is displaceable by a respective actuator acting on the strip between its ends, at least some of the strips interdigitating with one another at their closure element-carrying ends from opposite sides of the substantially linear array of nozzles.

With this arrangement, only the tips of the flexible strips, which form or carry the closure elements need be positioned immediately adjacent to the nozzles, where they can be extremely narrow and barely larger than the nozzle orifices which they are to close. As at least some of the strips interdigitate at their tips from opposite sides of the array, the widths of the strips can be stepped to a larger dimension beyond the interdigitation, to provide the strips with adequate strength. The strip providing the closure element for at least one of the end nozzles in the array may extend generally in the direction of the array rather than from one side of the array, in order to make the optimum use of the space surrounding the array to accommodate strips of maximum width but of very small tip size adjacent to the respective nozzles. Although orienting the strips for the end nozzles in the general direction of the linear array of nozzles, may have spatial advantages in positioning the strips, there will be circumstances where it will not be desirable to do this for the strip cooperating with the lowermost nozzle of the linear array. This is because in certain cases it is desirable for this nozzle to be as close as possible to the bottom of the printing head, for example to avoid cutting away part of a conveyor to accommodate the printing head when the lowermost side portions of cartons carried on the conveyor are to be marked.

It is anticipated that a printing head according to the invention may provide an array of nozzles with a shorter overall length than hitherto, for example an array of seven nozzles with a length of 6 mm or even less.

The flexible strips are preferably made of a resilient material, such as thin metal sheeting. The resilience of the strips may provide a restoring force, against which the respective actuator acts, for example to displace the closure element-providing tip of the strip into sealing engagement with the respective nozzle orifice. However, an additional spring will normally be necessary for this purpose and may be provided by a coil or leaf spring bearing against a face of the strip. For maximum simplicity of construction and assembly, the strips may be formed integrally with one another, for example by etching a metal sheet. The strips may then be united by a surrounding arcuate strip.

The actuators may be conventional solenoids, connected to mid portions of the respective strips by, for example, flexible wires. Alternatively, each strip might carry on a mid portion an armature of magnetic material, which cooperates with an adjacent electromagnetic coil. Irrespective of the type of actuator, the fact that the actuators act on the strips between their ends, provides a mechanical advantage so that the closure element-providing tips of the strips are displaced by more than the stroke provided by the actuator at the mid portions of the strips. However, for uniformity of construction and operation of the actuators and closure elements, it is desirable that the same mechanical advantage obtains for all strips, this conveniently being provided by ensuring that the ratio of the distance from the fixed end of each strip about which the strip flexes to the point at which the respective actuator operates on the strip, to the distance between the fixed end of the strip and the closure element at the other end of the strip, is the same for all strips. Most simply these dimensions are the same for all strips.

Examples of some parts of a printing head constructed in accordance with the present invention are illustrated in the accompanying drawings, in which.

Figure 1:
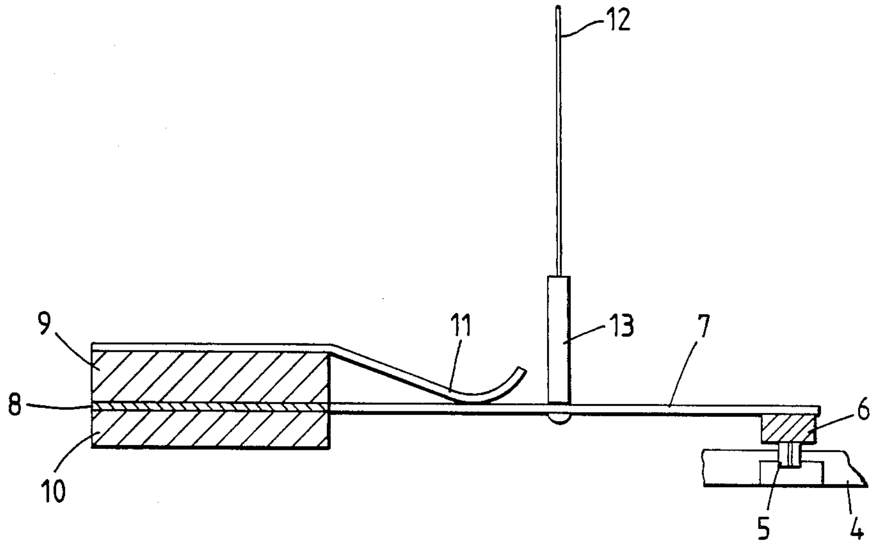
FIG. 1 is a partially sectioned plan of one strip and nozzle.

FIG. 1 shows part of a wall 4 of an ink chamber, which may be of the general kind disclosed in GB-A No. 2134452, having a vertical linear array of seven jewelled nozzles 5. In this case, each nozzle may be closed by a closure element in the form of a pad 6 carried at the tip of a flexible metal strip 7 which is formed integrally with a ring 8 clamped between blocks 9 and 10. A leaf spring 11 carried by the block 9 urges the strip 7 to flex downwardly so that the closure element pad 6 seals the orifice through the nozzle 5. The nozzle is opened by operation of a solenoid connected to an end of a flexible pulling wire 12, having a head 13 which is fixed to the mid point of the flexible portion of the strip 7. Conventional control arrangements are used for operating the solenoids so that the nozzles 5 are opened appropriately to cause discharge from the chamber of the necessary ink jets.

Figure 2:
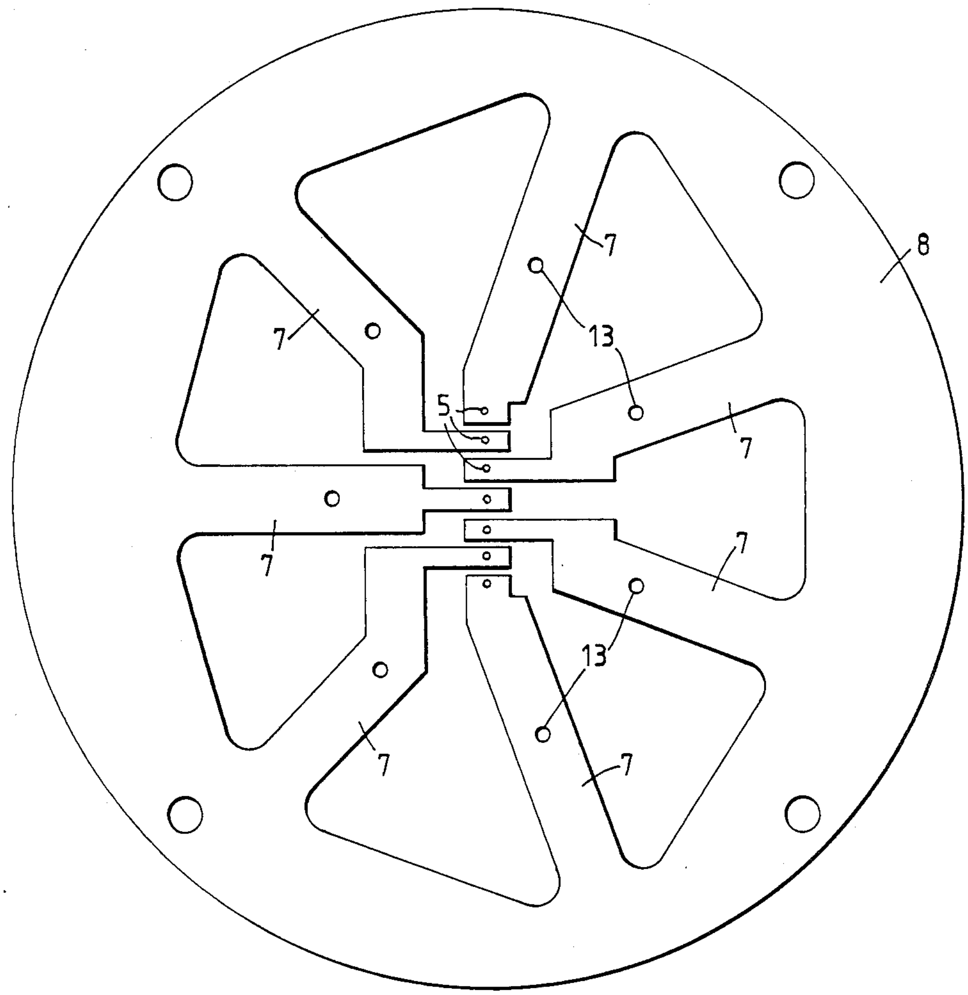
FIG. 2 is an elevation of one strip assembly.

FIG. 2 shows what might be termed a circular arrangement in which seven of the substantially coplanar fingers 7 extend generally radially inwardly as leaves from the ring 8 and have tips carrying the pad 6 overlying respective nozzles 5. The strips are widened stepwise from the inner tips radially outwardly and it will be seen that the tips of the central five strips interdigitate with one another from opposite sides of the array of nozzles.

Figure 3:
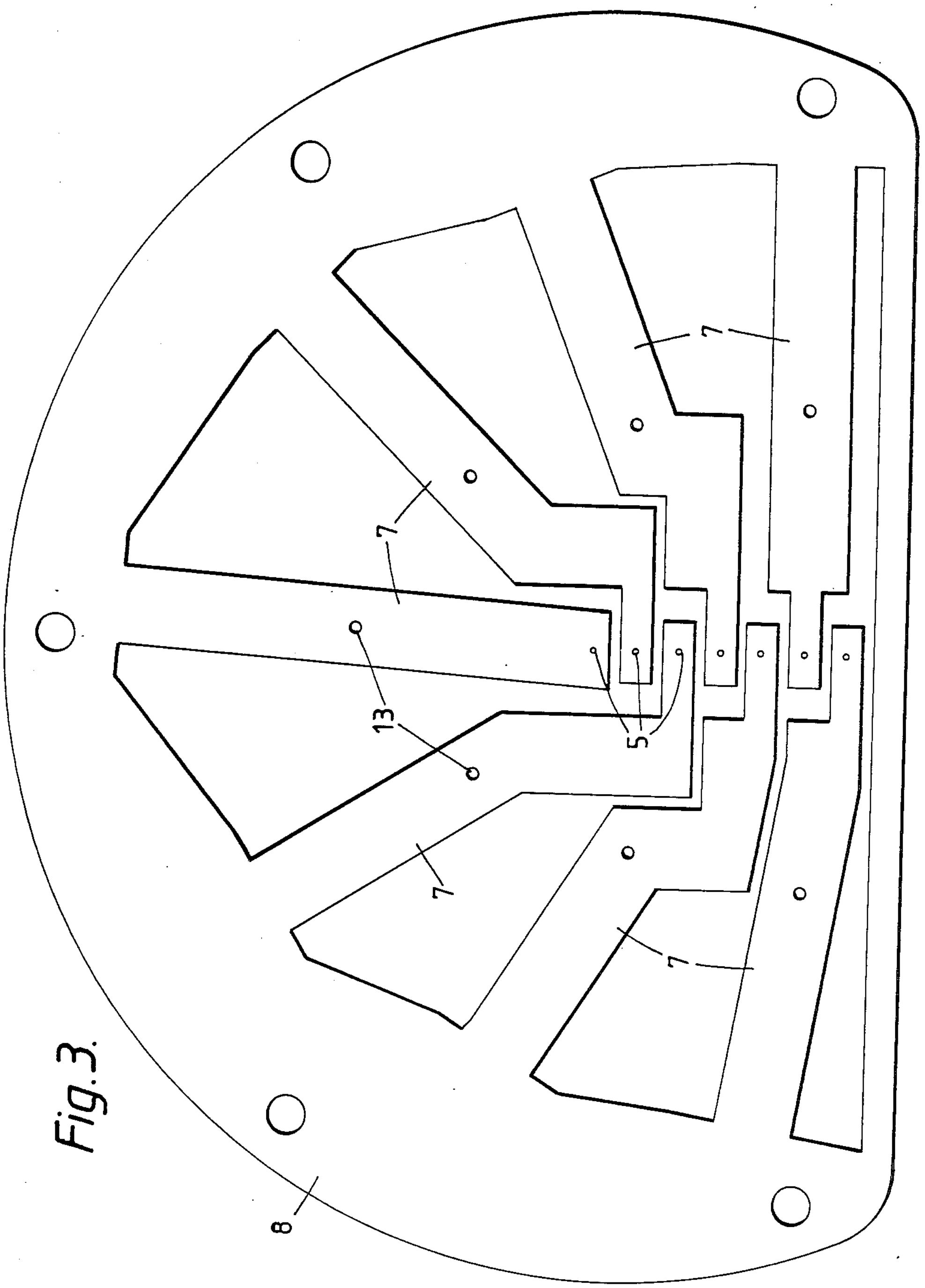
FIG. 3 is an elevation of a second strip assembly.

FIG. 3 shows a modified arrangement in which the lower six of the tips of the strips 7 interdigitate with one another. This might be termed a D-shaped arrangement, in which the lowermost nozzle may be positioned very close to the lower edge of the printing head.

Although, as illustrated, the arrangements are each of seven nozzles and strips, other numbers may be used as appropriate and the strip layout will be modified accordingly.

I claim:

1. An ink jet printing head having a chamber for pressurized fluent marking material, a substantially linear array of outlet nozzles leading from said chamber, and a plurality of closure elements adapted to be selectively displaceable by respective actuators to open and close respective ones of said nozzles; wherein said closure elements are provided on respective flexible strips (7), each of which is fixed at one end thereof and has said closure element at said other end thereof and is displaceable by a respective actuator acting on said strip between said ends, at least some of said strips interdigitating with one another at said other ends from opposite sides of said substantially linear array of nozzles.

2. A head according to claim 1, wherein at least some of said strips are stepped to a larger dimension beyond said interdigitation.

3. A head according to claim 1, wherein said strip providing said closure element for at least one end nozzle in said array extends generally in said direction of said array.

4. A head according to claim 1, wherein said strips are formed integrally with one another.

5. A head according to claim 4, wherein said strips are united by a surrounding arcuate strip.

6. A head according to claim 1, wherein said strips are made of a resilient material.

7. A head according to claim 6, in wherein said material is thin metal sheeting.

8. A head according to claim 6, wherein said resilience of each of said strips provides a restoring force, against which said respective actuator acts.

9. A head according to claim 8, wherein said restoring force displaces said other ends of the strips into sealing engagement with the respective nozzle orifice.

10. A head according to claim 8, wherein an additional spring is provided for each of said strips to urge said other end of the strip into sealing engagement with said respective nozzle orifice.

* * * * *